US009928435B2

(12) United States Patent
El-Khamy et al.

(10) Patent No.: US 9,928,435 B2
(45) Date of Patent: Mar. 27, 2018

(54) SYSTEM AND METHOD FOR PROVIDING AN ON-CHIP CONTEXT AWARE CONTACT LIST

(71) Applicant: Samsung Electronics Co., Ltd., Gyeonggi-do (KR)

(72) Inventors: Mostafa El-Khamy, San Diego, CA (US); Inyup Kang, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 91 days.

(21) Appl. No.: 15/061,206

(22) Filed: Mar. 4, 2016

(65) Prior Publication Data

US 2017/0193315 A1  Jul. 6, 2017

Related U.S. Application Data

(60) Provisional application No. 62/272,939, filed on Dec. 30, 2015.

(51) Int. Cl.
*G06K 9/00* (2006.01)
*G07C 9/00* (2006.01)
*G08G 1/054* (2006.01)
*H04N 7/18* (2006.01)

(52) U.S. Cl.
CPC ..... *G06K 9/00892* (2013.01); *G06K 9/00288* (2013.01); *G06K 9/00838* (2013.01); *G07C 9/00158* (2013.01); *G08G 1/054* (2013.01)

(58) Field of Classification Search
USPC ........ 382/100, 103–107, 118, 155, 162, 168, 382/173, 181, 190–192, 209, 224, 232, 382/254, 276, 286–291, 305, 312; 355/38; 348/94
See application file for complete search history.

(56) References Cited

U.S. PATENT DOCUMENTS

| 5,227,837 | A * | 7/1993 | Terashita | G03B 17/24 355/38 |
| 8,189,927 | B2 * | 5/2012 | Steinberg | G06K 9/00221 382/118 |
| 2014/0050372 | A1 * | 2/2014 | Qi | G06K 9/00221 382/118 |

(Continued)

OTHER PUBLICATIONS

Poladian, Charles, NameTage: Facial Recognition App Checks If Your Date Is a Sex Offender But Should You Use It?, Jan. 14, 2014.

(Continued)

*Primary Examiner* — Seyed Azarian
(74) *Attorney, Agent, or Firm* — The Farrell Law Firm, P.C.

(57) ABSTRACT

A system, method and device for object identification is provided. The method of identifying objects includes, but is not limited to, calculating feature vectors of the object, calculating feature vectors of the object's context and surroundings, combining feature vectors of the object, calculating likelihood metrics of combined feature vectors, calculating verification likelihood metrics against contact list entries, calculating a joint verification likelihood metric using the verification likelihood metrics, and identifying the object based on the joint verification likelihood metric.

20 Claims, 3 Drawing Sheets

(56) References Cited

U.S. PATENT DOCUMENTS

2015/0049910 A1* 2/2015 Ptucha .............. G06F 17/30256
                                                        382/103
2015/0131872 A1* 5/2015 Ganong ............. G06K 9/00677
                                                        382/118

OTHER PUBLICATIONS

International Business Times, Copyright 2014 IBT Media Inc., pp. 4.

* cited by examiner

SYSTEM AND METHOD FOR PROVIDING AN ON-CHIP CONTEXT AWARE CONTACT LIST

PRIORITY

This application claims priority under 35 U.S.C. § 119(e) to U.S. Provisional Patent Application No. 62/272,939, which was filed in the U.S. Patent and Trademark Office on Dec. 30, 2015, the content of which is incorporated herein by reference.

BACKGROUND

1. Field of the Disclosure

The present disclosure generally relates to object recognition, and more particularly, to a system and method for providing an on-chip context aware contact list.

2. Description of the Related Art

Users of electronic devices require increasing functionality in the applications and services provided by the electronic devices and communication networks used to connect those devices. In certain environments and in certain cases, a first user of an electronic device may meet a second user in which the first user does not know the second user's name, title or other contact information because the first user has forgotten the second user's name, or the first user has not been previously introduced to the second user. Also, the first user may be able to identify the second user, but is unaware that the second user is in the surrounding environment, or the first user may recognize that the second user is an acquaintance but cannot remember the context of the relationship (e.g., business or personal) or the name of the second user. Alternatively, the first user may have been virtually introduced to the second user via a social media network and not physically introduced; therefore, the first user is unable to identify the second user in person.

In a business environment, a similar problem arises in which employees, peers or colleagues meet one another in meeting rooms, company areas and professional conferences and have not been previously introduced to one another. The employees or colleagues may not know the identity of the other people but would like to identify and be introduced to certain people. For example, a person may like to speak with the author of a paper or a potential collaborator, but does not know what that author or collaborator looks like. As another example, in meeting rooms, an employee would like to speak with a specific person, manager or peer but cannot identify that person. As another example, a law enforcement agency may be searching for a certain person (e.g., a missing person or a suspect), but cannot identify such person whether alone or in a crowd. The law enforcement agency may not be actively searching for such person but are still interested in locating them.

In certain environments, such as in big conferences and office buildings, although wireless networks may be available, access to the Internet may be limited due to data traffic congestion or low signal strengths due to coverage limitations resulting in low bandwidth and high latencies for services requiring network access such as a server query. In other environments, identification speed of the object or person of interest may be very important, such as in the law enforcement example if the person to be identified is driving, there may be limited time to identify the target person. Therefore, identification should be very fast and reliable.

In other environments, security systems may need a second factor authentication to verify the first authentication factor. Two factor authentication may be used to identify a person whose image is captured by a camera, and combine the authentication of the image with another authenticating factor such as a signature, a fingerprint, a radio frequency identification (RFID), a scanned company badge or voice recognition. Fast identification and secure authentication may be needed. Depending on the identified contact, certain actions may be automated as a result of the identification, such as providing clearance, alerting authorities or blocking access to a device or premises. Similarly, alternative actions may be taken if the identification results from the two authentication factors do not agree with one another.

SUMMARY

The present disclosure has been made to address the above problems and disadvantages and to provide at least the advantages described below.

A system, method and device for object identification is provided. The method of identifying objects includes, but is not limited to calculating feature vectors of the object, combining feature vectors of the object, calculating likelihood metrics of combined feature vectors, calculating verification likelihood metrics against contact list entries and calculating a joint verification likelihood metric using the verification likelihood metrics.

In accordance with an aspect of the present disclosure, a method of identifying objects is presented. The method includes, but is not limited to, calculating feature vectors of the object, calculating feature vectors of the object's context and surroundings, combining feature vectors of the object, calculating likelihood metrics of combined feature vectors, calculating verification likelihood metrics against contact list entries, calculating a joint verification likelihood metric using the verification likelihood metrics, and identifying the object based on the joint verification likelihood metric.

In accordance with another aspect of the present disclosure, an electronic device for identifying objects is presented. The electronic device includes, but is not limited to, a memory that stores a context aware contact list, an intelligent machine, and a sensor block that acquires sensor data of a surrounding environment, wherein the intelligent machine calculates and combines feature vectors of the sensor data, calculates likelihood metrics of the combined feature vectors, calculates verification likelihood metrics against contact list entries in the context aware contact list, and calculates a joint verification likelihood metric using the verification likelihood metrics.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

Figure 1:
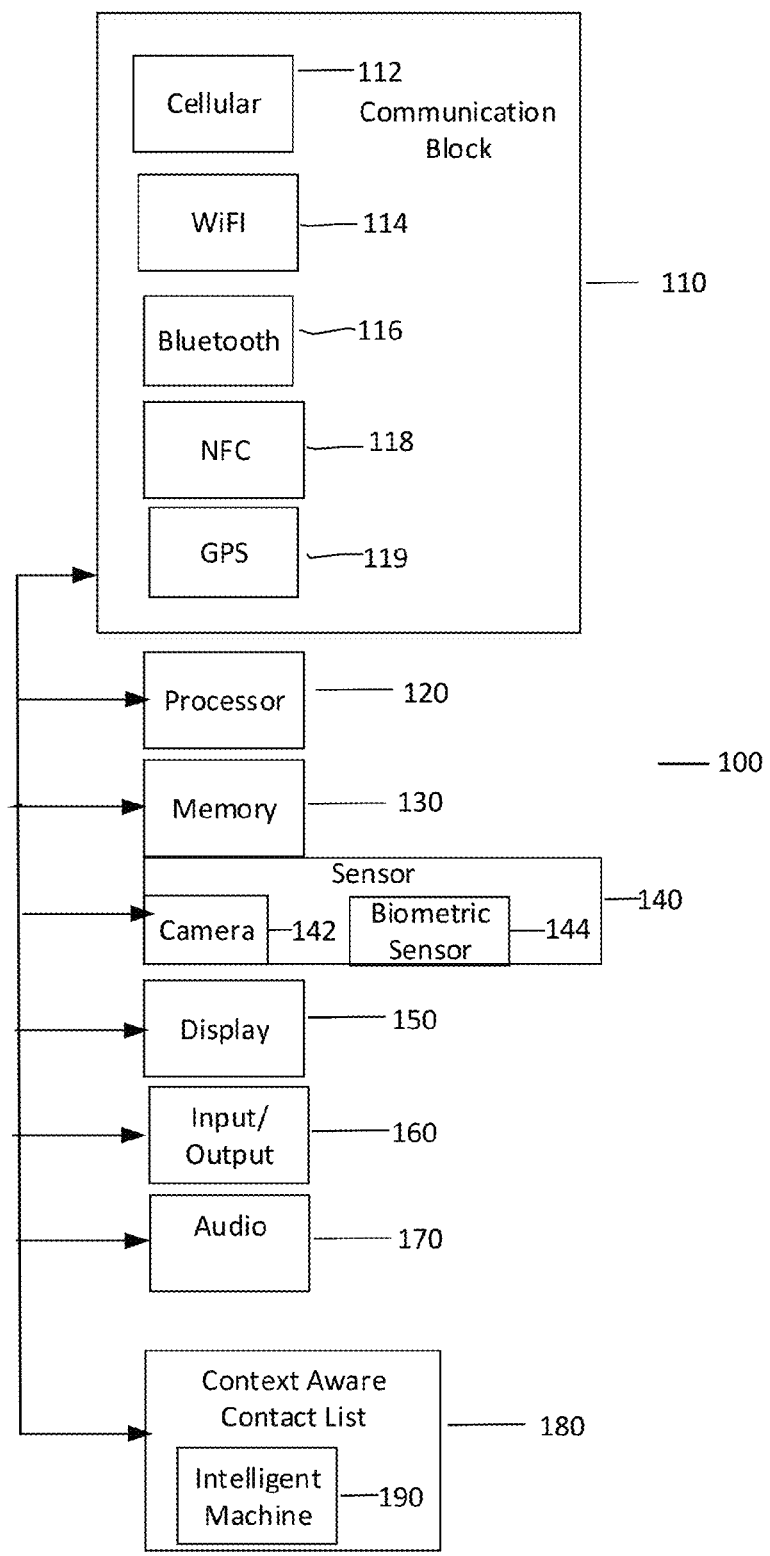
FIG. 1 is a schematic block diagram of an electronic device, according to an embodiment of the present disclosure.

The present disclosure will now be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. In the drawings, the size and relative sizes of layers and regions may be exaggerated for clarity. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly, a second signal may be referred to as a first signal without departing from the teachings of the disclosure.

The terminology used herein is for the purpose of describing particular embodiments only and is not intended to be limiting of the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

FIG. 1 is a schematic block diagram of an electronic device, according to an embodiment of the present disclosure.

In FIG. 1, an electronic device 100 according to an embodiment of the present disclosure includes, but is not limited to, a communication block 110, a processor 120, a memory 130, a sensor block 140, a display 150, an input/output block 160, an audio block 170 and a context aware contact list 180. Although the context aware contact list 180 is shown as a separate block within the electronic device 100, the context aware contact list 180 may be a portion of one or more of the other blocks 110-170 without deviating from the scope of the present disclosure.

The electronic device 100 includes, but is not limited to, a communication block 110 for connecting the device 100 to a network for communication of voice and data. The communication block 110 contains wide area, local area, personal area, near field and short range communications. In particular, the cellular communications block 112 provides a wide area network connection through terrestrial base transceiver stations using technologies such as Long Term Evolution. The Wi-Fi communications block 114 provides a local area network connection through network access points using technologies such as IEEE 802.11. The Bluetooth communications block 116 provides personal area direct and networked communications using technologies such as IEEE 802.15. The Near Field Communications (NFC) block 118 provides point to point short range communications using standards such as ISO/IEC 14443. The communication block 110 also includes, but is not limited to a GPS satellite signal receiver 119. The GPS receiver 119 provides for receiving Global Positioning System signals in order to compute the device's absolute position, velocity, acceleration and time. The electronic device 100 may receive electrical power for operating the functional blocks from a battery.

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the context aware contact list 180 and intelligent machine 190 including communication control between the functional blocks. The processor 120 may also update the databases and libraries associated with context aware contact list 180 and intelligent machine 190.

The memory 130 provides storage for device control program code, user data storage, application code and data storage. The memory 130 may provide data storage for the libraries, databases, look up tables and calibration data required by the context aware contact list 180 and intelligent machine 190. The databases may include image data, object data, context data, and the like. The program code and databases required by the context aware contact list 180 and intelligent machine 190 may be loaded into local storage within the context aware contact list 180 and intelligent machine 190 from the memory 130 upon device boot up. The context aware contact list 180 and intelligent machine 190 may also have local non-volatile memory for storing the program code, libraries, databases and look up table data.

The sensor block 140 may contain physical sensing devices for sensing physical conditions internal and external to the electronic device 100. The sensor block 140 may also contain electronic conditioning circuits and software control for manipulating sensor data and making it available to the other blocks in the electronic device 100. The sensor block 140 includes, but is not limited to a camera block 142 which may include multiple image sensors for photographing still and moving (video) images. The image sensors may be located at various positions on the electronic device 100 in order to capture images in the surrounding environment of the electronic device 100. The camera block 142 may also include a light focusing lens and a light emitting flash such as an LED. The images captured by the image sensors in the camera block may be used for object or person identification in the context aware contact list 180 and intelligent machine 190. The sensor block 140 also includes, but is not limited to a biometric sensor block 144 which senses various biometric parameters of the user or surrounding environment. The biometric parameters sensed by the biometric sensor block 144 may include fingerprint, iris scan, pulse rate, scent, retina and DNA. The biometric parameters may be provided to the context aware contact list 180 and intelligent machine 190 for the identification and authentication of users, objects and persons targeted for identification. The sensor block 140 may also include other sensors such as motion detection sensors and infrared sensors.

The display 150 may be a touch panel, and may be embodied as an LCD, LED, OLED, AMOLED, and the like. The input/output block 160 controls the interface to the user of the electronic device 100. The audio block 170 provides for audio input and output to/from the electronic device 100. The audio input from the audio block 170 may be provided to the context aware contact list 180 and intelligent machine 190 for voice recognition, authentication or identification of context of the surrounding environment.

The context aware contact list 180 may provide storage (e.g., contact list entries) and computing resources which enable identification of targeted objects or persons in the area surrounding the electronic device 100. The context aware contact list 180 includes, but is not limited to an intelligent machine 190. The intelligent machine 190 may include artificial neural network units, multiple graphics processing units (GPUs), central processing units (CPUs), digital signal processors (DSPs) or custom designed hardware and software.

According to an embodiment of the present disclosure, the context aware contact list 180 is provided with image data including still and video images from the camera block 142, access to the data and programs stored in the memory block 130, and one or more intelligent machines 190. The context aware contact list 180 may include multiple lists of contacts classified into multiple groups, including, for example, a clearance group, a blocked group, a black list group, an acquaintance group, a family group and a social media group. The present system and method determines an identification result by identifying a contact such as a person, in the contact list that matches an object, such as a face, in a still or video image stored in a database in the memory block 130 or generated from the camera block 142. The present system and method may further determine an identification result by identifying the environment surrounding the contact in the still or video image and use the identified surrounding environment result to further enhance the confidence in the identification result by matching the identified surrounding environment with a contact associated with a contact group.

According to an embodiment of the present disclosure, the system and method further identifies other objects of interest in the surrounding environment, which may be accompanying the identified contact or existing in the identified surrounding environment. The present system and method associates a feature vector generated by the intelligent machine 190 with a contact in the context aware contact list 180. Furthermore, other feature vectors generated by the intelligent machine 190 may be associated with other objects associated with the contact (e.g., electronic device, clothing, weapon or vehicle) or surrounding environments (e.g., business office, sports arena, park or urban area). The present system and method may combine the results of multiple feature identifications in order to increase the confidence in the identification of the contact including face identification, voice identification, fingerprint identification, signature verification, and/or the results of other identification methods such as mechanical and infrared sensors, RFID and security badges.

According to an embodiment of the present disclosure, the present system and method notifies a user of the electronic device 100 if a contact stored in the user's context aware contact list 180 is identified as a person in the environment surrounding the user. The present system and method may also trigger certain automatic actions to be taken if the person(s) or object(s) identified in the surrounding environment satisfy certain criteria, as determined by the intelligent machine 190. The methods required for performing the identification of persons or objects associated with the user's context aware contact list 180 may be executed entirely on the intelligent machine 190, partially on the intelligent machine 190 and partially on a remote server, or entirely on a remote server based on computational complexity, power limitations, resource constraints, and level of safety and security requirements. The intelligent machine 190 may be designed and trained offline and only the final parameters required to execute the identification methods are stored in the memory 130 on the electronic device 100. Furthermore, to reduce implementation and run-time complexity, when the context aware contact list 180 includes, but is not limited to, multiple intelligent machines 190, the intelligent machines 190 may share entirely or in part, the same architecture and configurations, as well as the same weights or parameters. The present system and method may be included in the electronic device 100, a moving vehicle, or secured at a fixed position depending on the application.

According to another embodiment of the present disclosure, the system and method provides context-aware identification of contacts and objects by providing context aware intelligence and surrounding environment based contact identification. The present system and method associates a desired object of identification with multiple machine-generated features and combines intelligence from intelligent machine(s) 190 to trigger the execution of automatic actions.

The present system and method provides context aware identification of contacts and objects by associating a feature(s) of a desired contact or object for identification (e.g., image of a face stored in a contact list entry) with a feature generated by the intelligent machine 190 while continuously scanning a surrounding environment and notifying a user if a desired contact or object has been identified. The present system and method includes, but is not limited to, an intelligent machine 190, which locates an object in an image, fits the located object to a template, and calculates one or more features of the object. The intelligent machine 190 further includes, but is not limited to, a verification machine that calculates a likelihood metric between a calculated feature and other known features associated with the context aware contact list 180 to return a list of potential contacts for identification.

According to another embodiment of the present disclosure, the system and method identifies an object and an environment surrounding the object, and uses the identified surrounding environment result to enhance an identification result of the object. For example, the object is a face captured in an image, and the surrounding environment in the image includes, but is not limited to a scene (e.g., outdoor, indoor, business office, or home). The system and method may also use additional associated features in identifying the object such as the location or position of the object as provided by the GPS receiver 119, voice recognition or identification as provided by the audio block 170, fingerprint and iris identification as provided by the biometric sensor block 144, and other features of surrounding objects such as a weapon or an animal. The camera 142 may be stationary or attached to a user or a moving vehicle to capture an image or video of the object and the object's surrounding environment. The present system and method enhances identification of the object based on context of the object including determining features of objects and surrounding environment, and prioritizing the search list of objects based on the surrounding environment, for example a scene (e.g., business office, outdoor, or home) or position, resulting in improved search speed. For example, a company contact list group is prioritized as the search list when the surrounding environment is identified as a business office.

According to another embodiment of the present disclosure, the present system and method may trigger an alarm if two independently calculated features provide contradicting identification results with a high confidence level (e.g., face identification feature contradicts other calculated identification features such as voice or fingerprint identification). The present system and method may trigger an alarm or provide an automated action if a specific object is detected (e.g., a weapon is identified in a video frame, or a person on a missing-persons list is identified). The present system and method further aggregates different calculated features for better accuracy, for example, facial features, voice features and biometric features.

The joint likelihood of correctly identifying the object using identification of multiple features of the object may be calculated based on the likelihoods of the individual features calculated in the intelligent machine 190, as well as the likelihood calculated based on the context or surrounding environment. The likelihood of identifying objects (contacts) correctly may be weighted by the likelihood associated with multiple individual calculated features, such as a product of likelihoods.

According to another embodiment of the present disclosure, the present system and method provides on-chip processing of the intelligent machine 190 within the electronic device 100. On-chip processing may allow for more efficient social networking, better collaboration between colleagues or peers in business or conference environments, as well as enhanced security. The present system and method may include multiple intelligent machines 190 that are trained offline, and run on-chip with pre-trained weights. To reduce chip complexity, one or more intelligent machines 190 may share architecture, processing resources and weights, entirely or in part. The intelligent machine 190 identifies objects using multiple layers of processing to calculate hierarchical features of the objects. According to another embodiment of the present disclosure, initial layers in the intelligent machine 190 are used to detect image edges and low resolution image identification of objects. The layers are then trained based on different objects targeted for identification, for example, to detect, classify, and hence identify a face, or a weapon. The same architecture may be re-used entirely or in part, and layer weights may be re-used in part for different targeted objects. Some layers of the intelligent machine 190 may be calculated on-chip and subsequent layers may be calculated on a server, based on the application.

According to another embodiment of the present disclosure, the present system and method associates each entry in a context aware contact list 180 with a machine-calculated feature vector. The context aware contact list 180 may be user-generated on the electronic device 100, downloaded from a server to the electronic device 100, or stored on a remote server. The present system and method may continuously scan a surrounding environment and notify a user if identification of certain object criteria is satisfied.

According to another embodiment of the present disclosure, the present system and method includes, but is not limited to, one or more intelligent machines 190 that identifies an object (e.g., a face in an image or video), fits the object to a pre-determined template, identifies the object in the template by calculating its feature vector, and calculates a verification likelihood metric between the feature vector of the fitted object and the feature vectors associated with the objects in a contact list.

According to another embodiment of the present disclosure, the present system and method includes, but is not limited to one or more intelligent machines 190 that identifies the surrounding environment of a contact person associated with a context aware contact list 180 and classifies the surrounding environment of the contact person as belonging to a certain class of environments. The intelligent machine 190 may further include object identification that identifies and classifies an object as belonging to one of a predetermined class, and locates and tracks specific objects in the surrounding environment.

According to another embodiment of the present disclosure, the present system and method includes, but is not limited to one or more intelligent machines 190 for voice identification, finger-print identification and signature identification. The electronic device 100 includes, but is not limited to infrared and radio frequency detection blocks that scan the environment for signals which support object identification.

According to another embodiment of the present disclosure, when the targeted object for identification is a face, the intelligent machine 190 weighs the calculated face-identification likelihood metric with contact entries in the context aware contact list 180 according to the identification likelihood metrics and according to the group affiliation of the contact entry. The present system and method may combine feature identification as described above. Certain actions may be automated if the different feature identifications provide conflicting results. Automatic actions such as alarms may be triggered if targeted persons or objects are identified in the surrounding environment.

The present system and method may be included in electronic devices 100, moving vehicles, and devices secured at a specific location. A notification system may be included in the context aware contact list 180 or connected to the context aware contact list 180. Likewise, memory 130, camera 142, and audio block 170 may be attached to the context aware contact list 180 physically or wirelessly.

According to another embodiment of the present disclosure, the present system and method uses on-chip processing to provide increased reliability and protect against failures in the case of remote server unavailability or power outages. One or more intelligent machines 190 may be physically attached to the context aware contact list 180 or located remotely based on complexity, speed, and reliability requirements. If an intelligent machine 190 is located remotely, outputs from the remote intelligent machine 190 may be exchanged between the context aware contact list 180 and the intelligent machine 190 at the remote location. The features calculated by the intelligent machine 190 at the remote location are verified, independently or jointly, against the features of the elements of the context aware contact list 180.

The parameters of a pre-trained intelligent machine 190 may include parameters of neural networks, which include multiple cascaded layers, such as weights, biases, and configurations of convolution filters, fully connected layers, recurrent neural network layers, auto-encoding layers, sampling layers, dimension reduction machines, and decision trees, as well as weights and biases of classifiers, support vector machines, and model fitting machines. Different machine layers may have different configurations, such as the filter size and stride, number of features calculated, types of non-linear operation, as well as the number of filters or neurons in the layer.

According to another embodiment of the present disclosure, the present system and method facilitates on-chip processing by allowing the intelligent machines 190 to share part of their configurations and pre-trained parameters. The parameters may be updated by a software download. Due to the similarity in operations of identifying, detecting, and classifying objects, faces, and surrounding environments, the different intelligent machines 190 may share some of their parameters. Some layers may have the same weights, biases and configurations across all intelligent machines 190 and other layers may share the same configuration and be fine-tuned according to the target object being identified.

The present system and method includes, but is not limited to, context aware contact list 180, provides context-aware intelligence, and contact identification in the surrounding environment. The present system and method associates a contact entry with one or more machine-generated features and provides on-chip intelligent machines 190 and on-chip processing, combines intelligence from different intelligent machines 190, notifies a user of an identified contact or object, and triggers automatic actions using the combined intelligence.

The context aware contact list 180 may be user-generated, accessed or downloaded from a remote server. A contact entry in the context aware contact list 180 may include multiple attributes including a name, an image, a phone number, an address, a job title, a group affiliation, an Internet web link, and an Intranet web link. The contact entry may further be associated with a feature vector, or a group of feature vectors, that is unique to each contact entry. The present system and method may generate the feature vector including various parameters based on an image, a video, or live camera feed of a person associated with the contact entry. The feature vector can be generated from the intelligent machines based on previous knowledge and observations, such as images or voices, of the associated persons.

According to another embodiment of the present disclosure, camera 142 may be connected wirelessly to the electronic device 100 such that the camera 142 is part of another device that is attached to a user or a moving object (e.g., a vehicle), and may provide continuous access to a live camera feed upon approval of the user. Alternatively, the image of the persons and objects to be identified may be provided electronically or physically by the contact person, or the image may be downloaded from a server or a social media website.

The present system calculates a feature vector based on the image and associates the feature vector with the contact person's entry in the context aware contact list 180. If the contact entry does not exist in the context aware contact list 180, the present system generates a new contact entry. The present system may further include memory 130 that is connected to, or part of, the electronic device 100 to store the feature vectors attributed to a respective contact entry in the contact list.

According to another embodiment of the present disclosure, multiple intelligent machines 190 are connected to the context aware contact list 180. For example, an intelligent machine 190 may calculate the feature vector from an image or live video containing a face of a person. A face detection method is used to detect the location of faces in the frames provided by the image or the live feed. Each face is extracted from the image and fit to a pre-defined model using a face-fitting method. A feature calculator in the intelligent machine 190 further calculates the features of the fitted face.

A feature-verification machine in the intelligent machine 190 calculates a contact verification likelihood metric between the returned feature vector and all feature vectors of contacts, or a group of contacts in the context aware contact list 180. If the likelihood metric satisfies a desired criteria, the feature-verification returns a contact or a group of contacts from the context aware contact list 180. In some applications, the contact with the highest verification likelihood metric is returned.

The present system and method may include multiple intelligent machines 190 that continuously scan the surrounding environment using image data from the camera 142, and provide an output that is used to weigh or bias the contact verification likelihood metric. If multiple contacts satisfy the contact verification likelihood metric criteria, the present system and method further sorts the contacts and weighs their contact verification likelihood metrics according to the context or the surrounding environment, together with the contact group affiliation to which the contact belongs (e.g., a contact with a home group affiliation is not expected to be in a business office surrounding environment). This method requires identification of the background surrounding environment from the captured image, and classifying the background surrounding environment as belonging to one of several pre-trained backgrounds (e.g., home, office, work, street, and sports arena).

According to another embodiment of the present disclosure, the present system and method continuously scans the surrounding environment for a targeted object and provides an automated action if the targeted object is identified. The intelligent machine 190 is pre-trained to identify the targeted object in a video frame. For example, the intelligent machine 190 may be pre-trained to identify a type of weapon in a captured video frame. If a weapon is identified, the present system and method may automatically trigger an alarm or a particular security procedure, for example, alerting an authority, signaling an evacuation, or providing an area lock down. The present system and method may be part of a security system that includes, but is not limited to a context aware contact list 180 to further identify a person carrying the targeted object (e.g., a weapon). For example, such a context aware security system may have the effect of lowering gun shootings in schools, and in public places, as well as enhancing private security.

The multiple intelligent machines 190 may include a voice identification machine, a signature identification machine, and a fingerprint identification machine. The intelligent machines 190 may receive data input from a mechanical sensor, an infrared sensor, and a RFID such as NFC 118. Each intelligent machine 190 may be operated independently to calculate a feature vector and compare the calculated feature vector to the corresponding feature vector of the contact person, to produce a likelihood metric of the contact person. The likelihood metrics of the individual features may then be combined to provide a final likelihood metric of the contact person. One method of combining likelihood metrics from different intelligent machines 190 is by taking their product. The present system and method may also trigger alarms if different intelligent machines 190 return conflicting results, each with a high confidence or likelihood metric. Alternatively, the feature vectors from the different intelligent machines 190 may be aggregated into one large feature vector. Further, dimension reduction techniques such as principal component analysis, or stacked auto-encoders, may be used to create a lower dimension feature vector from the aggregated feature vector by selecting the most dominant components of the stacked feature vectors from the different intelligent machines 190. The verification likelihood metric may then be calculated against the aggregated feature vector, or the aggregated feature vector after dimension reduction. The methods above may be executed by the intelligent machine 190.

If the intelligent machine 190 identifies a targeted contact, the electronic device 100 may provide a notification to the user including contact information and other attributes associated with the contact. Alternatively, the electronic device 100 may send the notification to another device (e.g., smart eyeglasses, a smartwatch, or a remote server). By notifying the user, an indication as to whether the present system returned a correct or wrong contact is provided as feedback to the system to improve the accuracy of the verification machine. If the returned contact is correct, the verification machine may combine the newly calculated attributes with the reference attributes for future identification, as explained above. Combining of feature vectors may be done by several means such as taking component maximum, average, weighted sum, or storing combined feature vectors as an alternative feature vector for the same contact. If a new person is identified, the user may store the new person as a new contact, which will be stored together with its newly calculated feature vector.

In environments described above, such as business offices, law enforcement, or conferences, the context aware contact list 180 may not be user generated or stored on the electronic device 100. Instead, the context aware contact list 180 may be stored on a server that is provided by an authority, a conference organizer, or a business administrator. In this case, the electronic device 100 may send the calculated attributes of the identified persons in the image or video feed to the server for verification. According to an embodiment of the present disclosure, the present device downloads images and contact information of the persons of interest such as a colleague or a missing person, or alternatively the attributes of the persons of interest is downloaded to memory 130 in the electronic device 100, for on-chip verification.

Each intelligent machine 190 may include a neural network, or cascades of neural networks. The cascades of neural networks may operate on the same input or on different inputs and provide results from different processes on the inputs, either in parallel or in series. Each cascade may include multiple layers that include linear filters defined by weights and biases, non-linear operations defined by non-linear functions, convolutional filters defined by weights, biases, filter sizes and filter strides, de-convolutional filters, fully connected or locally connected layers of such networks, and logistic classifier layers. Each layer may include multiples of such components or filters. The determination of the configuration, such as the density of filters, number of multiple filters, and connections between filters, of the machine cascades, as well as their parameters such as filter weights, biases, strides, non-linear functions is determined during the training phase. The methods and functions above may be executed by the intelligent machine 190. The pre-trained machines are then loaded into the electronic device 100 to calculate the feature vectors.

According to an embodiment of the present disclosure, the present device may include all the above described intelligent machines 190 on-chip for reduced latency real-time processing. The intelligent machines 190 may be pre-trained such that only the pre-trained parameters and configurations of the intelligent machines 190 are stored on the electronic device 100. A subset of the intelligent machines 190 may be implemented on-chip in the electronic device 100 and a specific output of the intelligent machines 190 may be sent to a remote server for processing. The intelligent machines 190 may be implemented on the electronic device 100 by software configuration or hardware configuration, or a combination of both. For example, face recognition or identification may be performed on the electronic device 100 if real-time operations are required as described above. Alternatively, the image may be sent to a remote server, where the intelligent machine 190 in the remote server will calculate the feature vector.

To lower device computational complexity, power consumption and memory storage requirements, the same intelligent machine 190 may be trained to execute multiple tasks. For example, the same intelligent machine 190 may be trained to identify multiple objects such as a face, a vehicle license plate, or a weapon in the image or video frame. Once an object is identified, the intelligent machine 190 will return a classification for the object with a likelihood metric. In other cases, each class of objects may have a separate intelligent machine 190, however, the separate intelligent machines 190 may share most of their layers, and only differ in a small number of subsequent layers which will be fine-tuned in the training phase for the specific objects.

According to an embodiment of the present disclosure, the present system and method provides facial identification of contacts in an electronic device 100. The present system and method augments a user's memory and intelligence with the electronic device 100 memory and intelligence. For example, the electronic device may be a smartphone. When contact information of a contact person is added to the electronic device 100, an image of the contact person is taken by the camera 142. On-chip processing on the intelligent machine 190 identifies the face in the image by bounding the regions where the face exists with bounding boxes, and extracts the pixel values within the bounding boxes. Each face in a bounding box is aligned to a specific template which may be 2-dimensional (2D) or 3-dimensional (3D) in space. This process may be executed by pre-trained deep networks or alternatively a specific pre-trained learned algorithm executed in the intelligent machine 190. The aligned image data of the face is provided to a feature extraction machine that is pre-trained, such as a pre-trained deep neural network or a cascade of such networks. The new feature vector is then processed, for example, by selection of key features by dimension reduction through another trained machine, such as a principal component analysis machine or auto-encoder. Other features of the contact person may also be calculated in a similar manner. For example, a sample voice of the contact may be stored, analyzed, and used to calculate another feature vector.

The different feature vectors may be combined by additional processing, including dimensional reduction into one key feature vector, or otherwise treated as different features for the same contact person. An entry of the contact person may be added or updated to the context aware contact list 180 and associated with corresponding feature vectors. To avoid duplicate contacts, the associated feature vectors may be compared to the set of stored feature vectors for other contacts. If the same contact already exists in the contact list as determined by matching feature vectors, then the feature vectors are combined in the context aware contact list 180 entry.

The camera 142 of the electronic device 100 may continuously scan the surrounding environment to detect one or more persons, calculate their features, invoke the feature verification method which verifies all features associated with the identified person and combines them. If a close match is found, the electronic device 100 provides a notification to the user including details of the identified person, which may be stored on or off the electronic device 100. This method identifies a name of the contact person if the user of the electronic device 100 has forgotten the name. In a conference or business meeting, this method may also help a user to know his/her colleagues' names and affiliations.

The present system and method provides on-chip processing to allow fast identification of a person which is needed in many social environments. In the case of large conferences, businesses or law enforcement agencies, the user is not expected to have previously met all persons in the surrounding environment. The feature vectors generated by the intelligent machine 190 may be sent to a server provided by the conference organizer or business administration through a private network or the public Internet. A query of possible matches may be executed on the server and the identity with the highest likelihood metric may be sent back to the user with a delay caused by network latency. Alternatively, the images of persons of interest may be downloaded beforehand to the electronic device 100, and their features calculated on the electronic device 100 for identification and verification.

According to an embodiment of the present disclosure, the present system and method provides offline facial recognition for security cameras. The present system includes, but is not limited to one or more security cameras that scan the surrounding environment. If the security camera identifies a person, the face bounding box is created in the image frame, followed by face alignment to a specific template, which may be executed by a pre-trained algorithm. The aligned extracted image is used to calculate a set of features for that person and stored in the database in memory 130. The detected person may be classified as belonging to a certain list (e.g., a clearance list, or a black list). The security camera may include on-chip processing as described above. When a person is detected, features of the detected person are calculated. A likelihood metric is calculated against all features in the list. The comparison returns all persons in both lists whose likelihood metric exceeds a threshold. The person with the highest likelihood metric is returned as an identified person or alternatively all persons that exceed the threshold may be returned with their likelihood metric. If none of the detected persons exceeds the threshold, then an unknown person result is returned.

According to an embodiment of the present disclosure, the security camera has access to servers which store the feature vectors of persons with certain attributes (e.g., a criminal background, an allowed employee with clearance), to compare the features of the detected person against images stored in a database of the server. If the identified person belongs to a list, the present system may provide one or more actions. For example, if the identified person belongs to a black list or a list with a criminal background, the present system may trigger an alarm and provide an alert, for example, to a security authority. If the identified person belongs to a list having clearance or allowed employees or family members, a second security procedure may be executed. The second security procedure may be another trained network which does voice recognition or identification, signature identification, or finger print identification. The present system may provide an alert if the identified person does not match a detected RFID or a scanned NFC badge. A second network on-chip may be pre-trained to detect weapons and dangerous objects. If a weapon is detected, the present system triggers an alarm and alerts security, as well as locks one or more doors and entry/exit points. The present system and method identifies a weapon by determining a location of a weapon in the image with a certain probability as well as the type of weapon. Such a feature may be used to enforce gun-free zones, for example, in a school. This feature may increase security where the security camera will continuously scan images for all types of weapons. Having the intelligent machine 190 on-chip with a backup battery, allows the processing to be fast and reliable.

Figure 2:
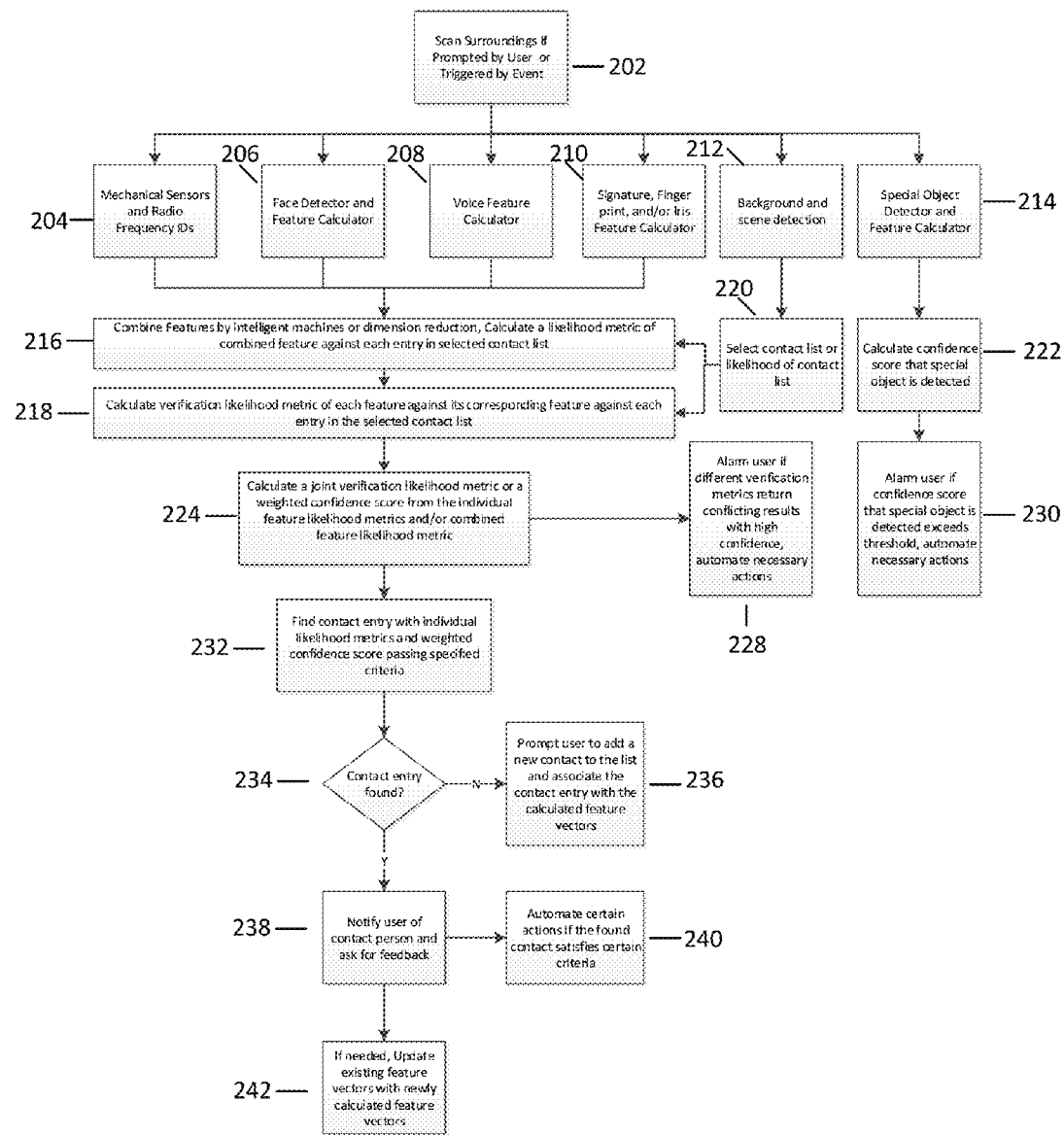
FIG. 2 is a flowchart illustrating an operation of object identification, according to an embodiment of the present disclosure.

FIG. 2 is a flowchart illustrating an operation of object identification, according to an embodiment of the present disclosure.

Referring to FIG. 2, at 202, the present system scans a surrounding environment if prompted by the user or if triggered by an event. For example, an event includes a motion detection sensor or an infrared sensor that detects a new activity. At 204, the sensor block of the present system scans for images from the camera 142 and RFID inputs from the NFC block 118. At 206, the present system executes face identification and feature calculations on the images received from the camera 142. At 208, the present system calculates voice features from the voice inputs that are received from the audio block 170. At 210, the present system calculates features from a signature that is received from the touch screen in the display block 150, a fingerprint, and an iris scan that is received from the biometric sensor block 144.

At 212, the present system identifies the background of the surrounding environment in the image that is received from the camera block 142. At 220, the present system determines a contact list group associated with a contact such as a family or a business based on the background of the surrounding environment identified in 212.

At 214, the present system identifies a desired object, such as a weapon, and calculates features for the desired object that is detected in the image received from the camera block 142. At 222, the present system calculates a confidence score on the desired object that is identified at 214. If the confidence score calculated at 222 exceeds a threshold, at 230, the present system triggers an alarm and pre-determined actions in response to the desired object identification.

At 216, the intelligent machine 190 of the present system combines the features calculated at 204, 206, 208, and 210 or reduces the dimensions of the features. In addition, the intelligent machine 190 of the present system calculates the likelihood metric of combined features and compares the likelihood metric of combined features to each entry in the contact list group determined at 220. At 218, the intelligent machine 190 of the present system calculates a verification likelihood metric of each feature against its corresponding feature and compares the verification likelihood metric to each entry in the contact list group determined at 220.

At 224, the present system calculates a joint verification likelihood metric or a weighted confidence score from the individual feature likelihood metrics and/or combined feature likelihood metric. At 228, the present system triggers an alarm and a pre-determined action if different verification metrics return conflicting results with a desired confidence. The desired confidence may be optimized numerically based on statistics of the confidence scores (levels). At 232, the intelligent machine 190 looks for a contact list entry with individual likelihood metrics and weighted confidence score satisfying a specified criteria.

At 234, if the specified criteria at 232 is satisfied, and a contact entry is found, the operation proceeds to 238. If the specified criteria in 234 is not satisfied, the present system prompts the user to add a new contact to the contact list and associate the contact entry with the calculated feature vectors at 236. At 238, the present system notifies the user that the contact person is identified and requests a feedback confirming the identified contact person. At 240, the present system automatically performs a pre-determined action if the identified contact satisfies certain criteria. At 242, if identification of the contact is confirmed, the present system updates the existing feature vectors of the contact's newly calculated feature vectors. The present system may perform a pre-determined action based on the system in context. If the present context aware contact list is part of a security system, the pre-determined action may include one or more of setting an alarm in a mobile device, alerting an authority, locking a door, and denying access to a security system. If the present context aware contact list is part of an auto-navigation system, the pre-determined action may include slowing down or stopping the vehicle.

Figure 3:
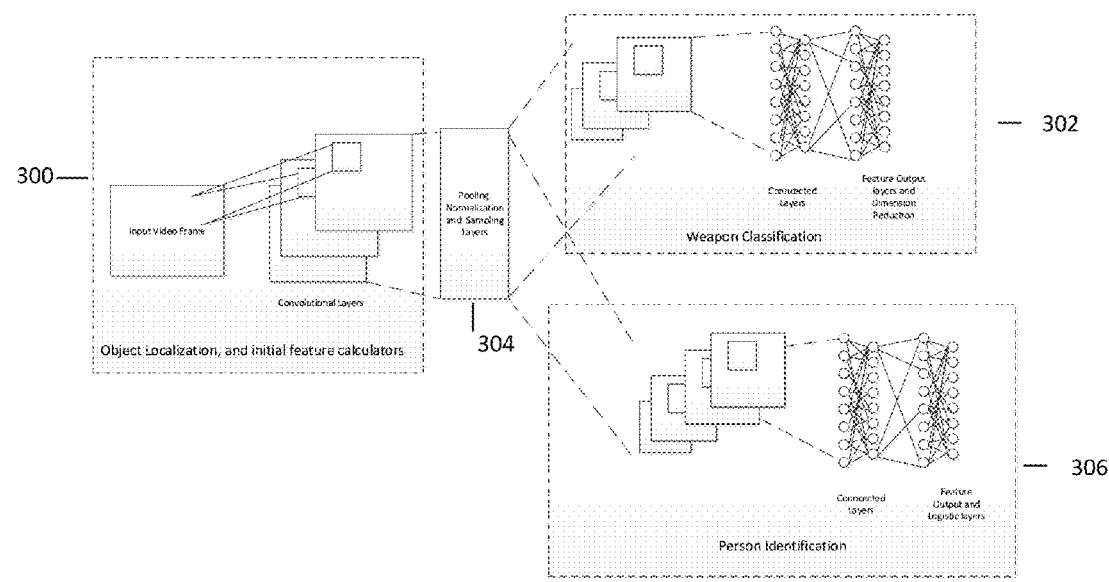
FIG. 3 is a diagram illustrating an operation of processing image layers, according to an embodiment of the present disclosure.

FIG. 3 is a diagram illustrating an operation of processing image layers, according to an embodiment of the present disclosure.

Referring to FIG. 3, diagram 300 shows a method of object localization and initial feature calculation which includes, but is not limited to processing the input video frame provided by camera 142 into convolutional layers. Diagram 304 shows a method of processing the layers by pooling, normalization and sampling. If the object for identification is a weapon, diagram 302 shows that the layers from the process of diagram 304 are further processed by connecting layers, outputting features of those layers and executing dimension reduction on the connected layers. If the object for identification is a person, diagram 306 shows that the layers from the process of diagram 304 are further processed by connecting layers, outputting feature and logistic layers.

Referring to FIG. 3, the weights, biases and connections of such layers are trained according to two objective functions, such as weapon classification accuracy, and person identification accuracy. The shared layers reduce the amount of storage needed to store network parameters and also reduce the computation time and power consumption. In an embodiment of the present disclosure, to simplify the training process, the weights, biases and connections of the shared layers 300, weapon detection and classification layers 302, and person identification layers 306 may be trained iteratively. For example, subnetwork 300, subnetwork 304, and subnetwork 302 may be trained to maximize weapon classification accuracy. This is followed by further fine tuning of subnetwork 300, subnetwork 304, and training of 306 to maximize person identification accuracy. Such a procedure may be repeated until a desired accuracy is reached in both objectives while having common shared layers 300 and 304. The weights, biases and connections are then used as part of the intelligent machine 190 to calculate the desired feature vectors. Further embodiments of artificial networks with more than two objectives and common shared layers may be derived from the present disclosure as well.

The context aware contact list may alternatively represent a database of objects, organs, or organisms, instead of persons, which are identified according to other classified contexts as described in the present disclosure.

While the present disclosure has been particularly shown and described with reference to certain embodiments thereof, it will be understood by those of ordinary skill in the art that various changes in forms and details may be made therein without departing from the spirit and scope of the present disclosure as defined by the following claims and their equivalents.

What is claimed is:

1. A method, comprising:
   calculating feature vectors of an object;
   calculating feature vectors of at least one additional input associated with the object;
   combining the feature vectors of the object and the at least one additional input;
   calculating likelihood metrics of the combined feature vectors;
   calculating verification likelihood metrics against contact list entries;
   calculating a joint verification likelihood metric using the verification likelihood metrics; and
   identifying the object based on the joint verification likelihood metric
   wherein each step above is performed by a pre-trained classifier.

2. The method of claim 1, further comprising:
   transmitting, using a communications module, at least one of the combined feature vectors, the verification likelihood metrics, the contact list entries, and the joint verification likelihood metric to a server.

3. The method of claim 1, wherein when the joint verification likelihood metric satisfies a specified criteria, a user is notified of a corresponding contact list entry.

4. The method of claim 3, further comprising updating contact list feature vectors when the user confirms correct identification of the object.

5. The method of claim 1, wherein the feature vectors are associated with at least one of an image, a facial image, an image background, a physical sensor, a voice recording, and a biometric sensor.

6. The method of claim 1, wherein calculating the joint verification likelihood metric comprises sharing computing parameters including at least one of weights, biases, and non-linear functions.

7. The method of claim 1, wherein identification of the object triggers execution of predefined automated actions.

8. The method of claim 7, wherein the predefined automated actions includes at least one of setting an alarm, alerting an authority, locking a door, controlling access to a security system, and navigating a vehicle.

9. The method of claim 1, wherein combining the feature vectors of the object comprises reducing dimensions of the combined feature vectors.

10. An electronic device for object identification comprising:
    a memory that stores a context aware contact list;
    an intelligent machine; and
    a sensor block that acquires sensor data of a surrounding environment,
    wherein the intelligent machine calculates feature vectors of an object, calculates feature vectors of at least one additional input associated with the object, combines the feature vectors of the object and the at least one additional input, calculates likelihood metrics of the combined feature vectors, calculates verification likelihood metrics against contact list entries in the context aware contact list, and calculates a joint verification likelihood metric using the verification likelihood metrics, each step being performed by a pre-trained classifier.

11. The electronic device of claim 10, further comprising a communication module.

12. The electronic device of claim 11, wherein the electronic device transmits at least one of the combined feature vectors, the verification likelihood metrics, the contact list entries, and the joint verification likelihood metric to a server.

13. The electronic device of claim 10, wherein when the joint verification likelihood metric satisfies a specified criteria, a user is notified of a corresponding contact list entry.

14. The electronic device of claim 13, further comprising updating contact list feature vectors when the user confirms correct identification of the object.

15. The electronic device of claim 10, wherein the feature vectors are associated with at least one of an image, a facial image, an image background, a physical sensor, a voice recording, and a biometric sensor.

16. The electronic device of claim 10, wherein the intelligent machine comprises shared computing parameters including at least one of weights, biases, and non-linear functions.

17. The electronic device of claim 10, wherein identification of the object triggers execution of predefined automated actions.

18. The electronic device of claim 17, wherein the predefined automated actions includes at least one of setting an alarm, alerting an authority, locking a door, controlling access to a security system, and navigating a vehicle.

19. The electronic device of claim 10, wherein combining the feature vectors of the sensor data comprises reducing dimensions of the combined feature vectors.

20. The electronic device of claim 10, wherein the contact list entries in the context aware contact list include at least one of a person, a weapon, a vehicle, a vehicle license plate, and an animal.

* * * * *